(12) United States Patent
Thapa et al.

(10) Patent No.: US 11,052,344 B2
(45) Date of Patent: Jul. 6, 2021

(54) DESULPHURIZATION OF MARINE EXHAUST FLUE GAS

(71) Applicant: YARA MARINE TECHNOLOGIES AS, Oslo (NO)

(72) Inventors: Shyam Bahadur Thapa, Oslo (NO); Peter Strandberg, Oslo (NO)

(73) Assignee: YARA MARINE TECHNOLOGIES AS, Oslo (NO)

( * ) Notice: Subject to any disclaimer, the term of this patent is extended or adjusted under 35 U.S.C. 154(b) by 143 days.

(21) Appl. No.: 16/078,043

(22) PCT Filed: May 11, 2017

(86) PCT No.: PCT/EP2017/061259
§ 371 (c)(1),
(2) Date: Aug. 21, 2018

(87) PCT Pub. No.: WO2017/194645
PCT Pub. Date: Nov. 16, 2017

(65) Prior Publication Data
US 2019/0060825 A1    Feb. 28, 2019

(30) Foreign Application Priority Data

May 11, 2016 (EP) .................................... 16169118

(51) Int. Cl.
*B01D 53/14* (2006.01)
*B01D 53/18* (2006.01)

(52) U.S. Cl.
CPC ..... *B01D 53/1412* (2013.01); *B01D 53/1425* (2013.01); *B01D 53/1481* (2013.01);
(Continued)

(58) Field of Classification Search
CPC ............ B01D 53/1412; B01D 53/1425; B01D 53/1481; B01D 53/18; B01D 53/78;
(Continued)

(56) References Cited

U.S. PATENT DOCUMENTS 4,491,566 A * 1/1985 Adams ............... B01D 53/1412
422/106
6,562,304 B1    5/2003 Mizrahi
(Continued)

FOREIGN PATENT DOCUMENTS

CN    102 151 481 A    8/2011
CN    104 923 056 A    9/2015
(Continued)

OTHER PUBLICATIONS

English machine translation of CN 102151481, obtained from ip.com (Year: 2011).*

(Continued)

*Primary Examiner* — Renee Robinson
(74) *Attorney, Agent, or Firm* — Amster, Rothstein & Ebenstein LLP (57) ABSTRACT

The application relates to a marine exhaust flue gas desulphurization system and method comprising a wet scrubber system for reducing the amount of sulphur oxides present in an exhaust flue gas of one or more diesel engines of a marine vessel using a scrubber liquid and being configured to run in an open and in a closed loop mode. A magnesium hydroxide slurry prepared by hydrolysis of magnesium oxide powder with water is contacted with the used scrubber liquid in order to clean the used scrubber liquid and/or to neutralize the acidity thereof.

21 Claims, 2 Drawing Sheets

(52) U.S. Cl.
CPC ........ _B01D 53/18_ (2013.01); _B01D 2251/402_ (2013.01); _B01D 2252/1035_ (2013.01); _B01D 2257/302_ (2013.01); _B01D 2258/01_ (2013.01); _B01D 2258/012_ (2013.01); _B01D 2259/4566_ (2013.01)

(58) Field of Classification Search
CPC ...... B01D 2252/1035; B01D 2257/302; B01D 2258/01; B01D 2258/012; B01D 2259/4566
See application file for complete search history.

(56) References Cited

U.S. PATENT DOCUMENTS

2013/0298761 A1* 11/2013 Hamad .............. B01D 53/1425 95/11
2016/0016109 A1  1/2016 Strandberg

FOREIGN PATENT DOCUMENTS

| EA | 001995 B1 | 10/2001 |
|---|---|---|
| JP | H08-80420 A | 3/1996 |
| JP | H09-192440 A | 7/1997 |
| JP | 2001-179048 A | 7/2001 |
| JP | 2004-195438 A | 7/2004 |
| JP | 2015-211959 A | 11/2015 |
| RU | 2377056 C2 | 12/2009 |
| WO | 99/02037 A1 | 1/1999 |
| WO | 2014128261 A1 | 8/2014 |
| WO | 2017220759 A1 | 12/2017 |

OTHER PUBLICATIONS

PCT International Preliminary Report on Patentability dated dated Sep. 5, 2018 in connection with PCT International Patent Application No. PCT/EP2017/061259, 33 pages.
PCT International Search Report and Written Opinion dated Jul. 7, 2017 for PCT International Patent Application No. PCT/EP2017/061259, 11 pages.
PCT Written Opinion of the International Preliminary Examining Authority dated Apr. 19, 2018 for PCT International Patent Application No. PCT/EP2017/061259, 5 pages.
Russian Office Action and Search Report dated Sep. 3, 2020 from Russian Patent Appln. No. RU 2018138256/05(063580).
Japanese Office Action dated Apr. 20, 2021 from Japanese Patent Application No. 2018-556898. (English language translation.).

* cited by examiner

DESULPHURIZATION OF MARINE EXHAUST FLUE GAS

CROSS-REFERENCE TO RELATED APPLICATIONS

This application is a U.S. national stage entry under 35 U.S.C. § 371 of PCT International Patent Application No. PCT/EP2017/061259, filed May 11, 2017, which claims priority to European Patent Application No. 16169118.3, filed May 11, 2016, the contents of which are incorporated herein by reference in their entirety.

TECHNICAL FIELD

The present application relates to the field of reducing the amount of $SO_x$ in exhaust flue gases from marine vessels using wet scrubbers. More specifically, the application relates to increasing the $SO_x$ absorption capacity of scrubber liquid used in a closed loop mode of the scrubber by using a magnesium hydroxide slurry for cleaning the used scrubber liquid.

BACKGROUND ART

Fossil fuel combustion is used in industrial processes for many different purposes. Unfortunately, fossil fuel combustion produces several contaminants, which have been found to be detrimental to the environment. In particular, sulphur and nitrogen oxide compounds are the major components of "acid rain". Sulphur is a naturally occurring element in crude oil, concentrated in the residual components of the crude oil distillation process. The amount of sulphur in the fuel oil depends mainly on the source of crude oil, and to a lesser extent on the refining process. $SO_x$ is a result of the combustion of sulphur containing compounds that are especially abundant in low-grade fuels. Typically for fuel on a worldwide basis, the value is in the order of 1.5-4%. These values lead to high concentration of $SO_2$ in flue gases. For example, when using a fuel containing 1.5% S, the concentration of $SO_2$ in the emitted gas is about 630 ppm, and with a fuel containing 4% S, the concentration of $SO_2$ in the emitted gas is about 1700 ppm.

Ships are fast becoming the biggest source of air pollution in the EU. Unless more action is taken, they are set to emit more than all land sources combined by 2020.

European waters have introduced as one of the first in the world more stringent sulphur emission regulations for ships, with the being into force of the so-called Sulphur Emission Control Areas (SECAs) in the Baltic Sea in 2006, followed by the North Sea and English Channel in 2007.

Under the European Union (EU) Marine Sulphur Directive, only low-sulphur fuels of less than 1.5% S are permitted. Furthermore a 1.5% sulphur cap in fuel are applied to fuels used by passenger vessels operating regular services to and from any community port from Aug. 11, 2006, and not just in SECAs. The EU legislation allows using technologies that abate the sulphur content in the emitted gas as an alternative to using low-sulphur fuels (of 1.5% S). Thus, the technology should assure reductions in sulphur emissions that are at least equal to, or better, than those achieved by lowering the sulphur content in bunker fuel.

Marine vessels typically use lean burn combustion engines and lower grade fuels that both results in high levels of $SO_x$ and particles present in the exhaust flue gas.

One possibility to reduce the content of $SO_x$ in the exhaust flue gas of marine vessels is by using low sulphur content fuels. Low sulphur content fuels are however far more expensive than normal low grade fuels.

Since the high costs of the low sulphur content fuels, the ship builders and owners have been forced to look for other solutions to reduce the SOx-content in the exhaust flue gas of the normal low grade fuels, this not only for new ships to be built but also more importantly for the current fleet of marine vessels.

Most of the flue gas desulphurization (FGD) technologies use wet scrubbing processes in which the emitted flue gases are brought into intimate contact with an aqueous scrubbing solution. The aim of these processes is to provide high absorption efficiencies and to remove, or substantially reduce, the concentration of particles, droplets or substances in the flue gas to be scrubbed. The scrubbing solution may be water, seawater or any other aqueous solution of one or more compounds known to bind, or absorb, one or more of the constituencies of the flue gas to be scrubbed. Acidic gases as $SO_x$ are normally removed from a solution by scrubbing with an alkaline solution, such as an aqueous solution of an alkaline compound, such as caustic soda or other alkaline substances.

A wet scrubber may be a packed scrubber, in which the scrubber or at least part of the scrubber is filled with a packing. The scrubbing solution flows at the surface of the packing to ascertain a large contact surface between the scrubber liquid and the gas that flows through the packing. Alternatively, the wet scrubber may not have a packing, but the scrubber liquid is sprayed into the scrubber to form a rain or a fog of scrubber liquid that is brought into contact with the flue gas to be scrubbed. The scrubber may also constitute both packed and non-packed zones.

The particles in the flue gas are taken along with the scrubber liquid and may either be released out of the wet scrubber together with the scrubber liquid, or are removed from the scrubber liquid by means of filters, centrifugation or any other means to separate solid particles from a liquid.

As a scrubber liquid, fresh seawater is relatively efficient. However, in certain geographical areas, for instance in the Baltic Sea, the discharge of seawater that has been used as a scrubber liquid for exhaust flue gases of marine vessels has been prohibited. To fulfil these requirements, there is a need for a closed loop scrubbing solution, i.e. a solution in which the scrubbing water is recirculated. Seawater however has a limited buffer capacity. Due to the acidic nature of the $SO_x$ present in the exhaust flue gas, the scrubber seawater becomes acidic and loses its $SO_x$ absorption capacity when used in a closed loop system.

In order to solve this problem, caustic soda (sodium hydroxide or NaOH) is the most commonly used chemical to control the pH in sulphur dioxide wet scrubbers. However, caustic soda is potentially hazardous for a worker to handle. Furthermore, caustic soda may, if overdosed, cause a pH that is far too high for depositing of the scrubber seawater into the sea.

Instead of caustic soda, it is also known to add magnesium oxide (MgO) or magnesium hydroxide ($Mg(OH)_2$) to the scrubbing (sea)water to increase its scrubbing capacity and/or to maintain the alkalinity and consequently the scrubbing capacity of the scrubber (sea)water in a closed scrubber liquid loop. By contrast to alkali materials such as sodium hydroxide, magnesium oxide and magnesium hydroxide may generally be considered as non-hazardous materials. As such, magnesium oxide and magnesium hydroxide may be safer for the personnel that may handle, or otherwise into contact with these materials, and may be safer for the environment, e.g.; in the event of a spill or a leak that may make its way into the surface water around and/or outside the marine vessel.

The absorption of $SO_x$ in an aqueous solution of $Mg(OH)_2$ may be exemplified by the absorption of $SO_2$ according to the following equations:

Absorption reaction 1: $Mg(OH)_2+SO_2\rightarrow MgSO_3+H_2O$

Absorption reaction 2: $MgSO_3+SO_2+H_2O\rightarrow Mg(HSO_3)_2$

Total reaction: $Mg(OH)_2+2SO_2\rightarrow Mg(HSO_3)_2$ $Mg(OH)_2$ is normally provided to the user in the form of a suspension or a slurry of $Mg(OH)_2$ in water. $Mg(OH)_2$ has a low solubility in water, and additives are normally used to avoid settling of $Mg(OH)_2$ to avoid the need for constant agitation of the suspension. However, the vibrations onboard of a vessel seem to reduce the effect of the chemical normally used to maintain $Mg(OH)_2$ in suspension.

Alternatively, MgO may be provided as a powder to be dissolved and reacted with water to according to the following equation:

$MgO+H_2O\rightarrow Mg(OH)_2$

The reaction above is highly exothermal and due care has to be taken to avoid excessive heating resulting boiling and potentially hazardous situations.

US 2015/0283499 discloses the use of a high solids magnesium hydroxide slurry in connection with exhaust scrubber systems for removing SOx and NOx compounds from exhaust gas emissions. The slurry includes a magnesium hydroxide compound and a carbohydrate-based viscosity control agent. The slurry may further include seawater as at least a portion of the liquid component. The magnesium compound utilized for forming the slurries include a magnesium oxide or a magnesium hydroxide material, which are amongst others provided in a powdered form. The powdered magnesium compound is then mixed with the available seawater traversed by the marine vessel to produce a magnesium hydroxide slurry having a relatively high solids concentration.

It is known that the magnesium compounds in the form of magnesium oxide powders require less storage space in a bunker of a marine vessel than alkali sources such as sodium hydroxide. Furthermore, the use of magnesium oxide and/or magnesium hydroxide may result in less sludge that may need to be managed by the owner of the marine vessel and eventually removed from the marine vessel and disposed of. Magnesium oxide and/or magnesium hydroxide are also generally known as being non-corrosive to metal surfaces, including the metal components of the marine vessel, as well as the metal components of the storage and pumping equipment and the exhaust scrubber system.

In CN 102151481, a monitoring and automatic control system in a desulfurization process for magnesium-based seawater ships is described using the magnesium-based seawater method. In this system, flue gas is led out of a main flue and enters a spray cooling system form a blower outlet, and a mist is sprayed in the direction of the airflow, reducing the flue gas temperature to 100° C. or less, assisting in producing a desulphurization effect, and assisting in the induction of flue gas. The desulphurization column is provided with a multi-stage sprinkling apparatus and a slurry pool with a constant liquid level. An oxidation blower supplies oxygen into the pool. A sprinkling pump is used to extract slurry from the slurry pool for cyclic cooling sprinkling and cyclic reaction sprinkling. The cooling liquid formed and spray liquid fall to the slurry pool under the action of gravity, and gas flows upwards, finally being discharged into the atmosphere through a smoke discharge port. Seawater and MgO-powder are fed into a slurry tank in given proportions, undergo motorized stirring and vapour constant-temperature heating. After ripening, fresh slurry is supplied quantitatively to each sprinkling pipeline along four paths from the outlet at the bottom end of the slurry tank.

The disadvantage of the system as described above is that the slurry is directly injected into the desulphurization column resulting in a high risk of clogging of the sprinkling system.

It is a goal of the application to provide a marine exhaust flue gas desulphurization system wherein the $SO_x$ absorption capacity of the scrubber liquid is increased by using a magnesium hydroxide slurry formed by the hydrolisation of water and magnesium oxide powder, avoiding the addition of chemical components to the magnesium hydroxide slurry and avoiding that the magnesium hydroxide slurry needs to enter the desulphurization (scrubber) column.

SUMMARY OF THE APPLICATION

According to a first aspect of the present application, a marine exhaust flue gas desulphurization system for reducing the amount of sulphur oxides present in an exhaust flue gas of one or more diesel engines of a marine vessel is provided, preferably a marine exhaust flue gas desulphurization system being configured for being able to run in both an open and a closed loop mode, wherein the marine exhaust flue gas desulphurization system comprises, particularly when configured to run in closed loop mode:
  a wet scrubber system comprising at least one wet scrubber arranged for scrubbing the exhaust flue gases originating from the diesel engine of the marine vessel using a scrubber liquid, thereby generating a used scrubber liquid, the wet scrubber system being arranged to run in a closed loop mode;
  at least one preparation reservoir arranged for preparing a magnesium hydroxide slurry by hydrolysing water with a magnesium oxide powder under agitation conditions;
  slurry transporting means for transporting the prepared magnesium hydroxide slurry towards the wet scrubber system, particularly for transporting the prepared magnesium hydroxide slurry from the at least one preparation reservoir towards the used scrubber liquid withdrawn from the wet scrubber, configured for there contacting the magnesium hydroxide slurry with the used scrubber liquid and cleaning the used scrubber liquid, when the wet scrubber system is running in the closed loop mode.

Thus, according to a preferred embodiment of the present application, a marine exhaust flue gas desulphurization system for reducing the amount of sulphur oxides present in an exhaust flue gas of one or more diesel engines of a marine vessel is provided, wherein the marine exhaust flue gas desulphurization system is configured for being able to run in both an open and a closed loop mode, wherein the marine exhaust flue gas desulphurization system comprises when configured to run in a closed loop mode:
  a wet scrubber system comprising at least one wet scrubber arranged for scrubbing the exhaust flue gases originating from the diesel engine of the marine vessel using a scrubber liquid, thereby generating a used scrubber liquid, wherein the wet scrubber comprises one or more used scrubber liquid withdrawal pipes for withdrawing the used scrubber liquid from the wet scrubber;

at least one preparation reservoir arranged for preparing a magnesium hydroxide slurry by hydrolysis of magnesium oxide (MgO) powder with water, the preparation reservoir comprising water addition means, MgO powder addition means and agitation means for mixing the water and the MgO powder;

slurry transporting means for transporting the prepared magnesium hydroxide slurry from the at least one preparation reservoir towards the used scrubber liquid withdrawn from the wet scrubber by the one or more used scrubber liquid withdrawal pipes there contacting the magnesium hydroxide slurry with the used scrubber liquid in order to clean the used scrubber liquid and/or to neutralize the acidity thereof.

During the wet scrubbing process, the flue exhaust gas passes through a screen of scrubber liquid, more particularly water and most particularly seawater. During this process, $SO_x$ is removed from the exhaust gas and consumes all the alkalinity contained in the scrubbing water. Through the absorption of $SO_x$ and other harmful gases by the water, the pH of the water is reduced. The $SO_x$ in the water changes to $SO_3$, which further changes to $H_2SO_4$ in the presence of oxygen according to the following equations:

pH adjustment:

oxidation:

In some areas, this used scrubber liquid cannot be discharged into the sea in which the marine vessel sails and has to be recycled. The acidified scrubber liquid can however not be re-used anymore into the wet scrubber since the acidity will reduce the adsorption capacity of $SO_x$ in the exhaust flue gas. In order to solve this problem, the magnesium hydroxide slurry that is formed through the hydrolysis of magnesium oxide and/or magnesium hydroxide slurry with water, will neutralize the acidic scrubber liquid formed during the wet scrubbing process of the exhaust flue gas. The magnesium hydroxide slurry further thus takes care that the $SO_x$ absorption capacity of the scrubber liquid is again increased.

The system according to the application further has the advantage that the $Mg(OH)_2$-slurry is added after the wet scrubber. There is no injection of $Mg(OH)_2$-slurry into the wet scrubber (desulphurization column) itself.

By preparing the magnesium hydroxide slurry in a preparation reservoir using agitating means, there is a fast mixing between the magnesium oxide powder with the water.

In an embodiment of a marine exhaust flue gas desulphurization system according to the application, the one or more used scrubber liquid withdrawal pipes are configured to withdraw the used scrubber liquid from the wet scrubber via a closed loop mode scrubber liquid recycle pipe towards a used scrubber liquid tank when the wet scrubber is operating in closed loop mode.

In a possible embodiment of a marine exhaust flue gas desulphurization system according to the application, the marine exhaust gas desulphurization system comprises a storage reservoir that is placed in series with the preparation reservoir and that is connected to the preparation reservoir via a slurry withdrawal pipe.

The provision of a second reservoir in the form of a storage reservoir for holding the magnesium hydroxide slurry takes care of a better hydrolisation meaning that a more homogeneous magnesium hydroxide slurry is obtained and the process of cleaning the used scrubber liquid can be controlled in a better way.

In a particular embodiment of a marine exhaust flue gas desulphurization system according to the application, the slurry transporting means comprise slurry transporting pipes for withdrawing the magnesium hydroxide slurry ($Mg(OH)_2$-slurry) from the preparation reservoir and/or the storage reservoir via the closed loop mode scrubber liquid recycle pipe towards the used scrubber liquid, particularly towards the one or more used scrubber liquid withdrawal pipes.

In an embodiment of a marine exhaust flue gas desulphurization system according to the application, the slurry withdrawal pipe is arranged with slurry pumping means for pumping the slurry out of the preparation reservoir into the storage reservoir and the slurry transporting pipes are arranged with slurry pumping means for pumping the slurry out of the storage reservoir towards the closed loop mode scrubber liquid recycle pipe.

In an embodiment of a marine exhaust flue gas desulphurization system according to the application, the marine exhaust flue gas desulphurization system further comprises flushing means for flushing the slurry pumping means and all pipes through which slurry flows after the slurry pumping means stopped pumping slurry.

In a particular embodiment of a marine exhaust flue gas desulphurization system according to the application, the water added to the MgO powder to prepare the $Mg(OH)_2$-slurry is fresh water or sea water with an emulsifier. An emulsifier is either a non-surface active polymer or a surface-active substance added to a suspension, usually a colloid, to improve the separation of particles and to prevent settling or clumping.

In a possible embodiment of a marine exhaust flue gas desulphurization system according to the application, the preparation reservoir comprises a flow meter for measuring the flow of the water that is added to the preparation reservoir.

In an embodiment of a marine exhaust glue gas desulphurization system according to the application, the preparation reservoir comprises MgO powder addition control means configured to control the MgO-powder addition means to gradually add MgO-powder to the preparation reservoir.

In a particular embodiment of a marine exhaust flue gas desulphurization system according to the application, the preparation reservoir comprises temperature transmitter means to measure the temperature inside the preparation reservoir, and comprises water addition control means configured to control the water addition means to add water into the preparation reservoir in case the temperature transmitter means measure a temperature of the prepared $Mg(OH)_2$-slurry that increases above a pre-set temperature limit.

The controlled addition of powder in the preparation reservoir avoids overheating due to the exothermal reaction between the MgO-powder and the water that are both added to the preparation reservoir.

In a particular embodiment of a marine exhaust flue gas desulphurization system according to the application, the storage reservoir comprises agitation means for agitating the $Mg(OH)_2$-slurry that is contained in the storage reservoir.

In a possible embodiment of a marine exhaust flue gas desulphurization system according to the application, the preparation reservoir, respectively the storage reservoir, comprises pressure transmitter means for indicating the actual level of the $Mg(OH)_2$-slurry in the preparation reservoir, respectively the storage reservoir, and comprises agitation control means that are configured to control the agitation means to continuously agitate the Mg(OH)$_2$-slurry prepared in the preparation reservoir, respectively the storage reservoir, as long as the pressure transmitter means indicate that the level of the Mg(OH)$_2$-slurry is above a predetermined minimum level.

By continuously agitating the magnesium hydroxide slurry, sedimentation of the magnesium hydroxide of the prepared slurry to the bottom of the preparation reservoir, respectively the storage reservoir, will be avoided.

In a possible embodiment of a marine exhaust flue gas desulphurization system according to the application, the MgO-powder addition means comprise powder transportation and addition means comprising one or more multi-screw conveyors that are controlled by transportation and addition control means configures to start and to stop the one or more multi-screw conveyors at any time during the process of adding the magnesium oxide and/or magnesium hydroxide to the preparation reservoir.

Multi-screw conveyors are reliable and the feeding speed may be controlled by starting and stopping the multi-screw conveyors.

In an embodiment of a marine exhaust flue gas desulphurization system according to the application, the marine exhaust flue gas desulphurization system further comprises dust arrestor means that comprise a dust arrester pipe that is in connection with the preparation reservoir and that comprise water spraying means arranged to spray water into the dust arrester pipe.

These dust arrestor means avoids that dust from the magnesium oxide powder to come out.

In an embodiment of a marine exhaust flue gas desulphurization system according to the application, the wet scrubber is a scrubber of the spraying type without a packing, and wherein the wet scrubber comprises a scrubbing tower having a multiplicity of spraying nozzles that each are arranged for spraying the scrubber liquid into the scrubbing tower in order to be brought into contact with the exhaust flue gas, the scrubbing tower optionally comprising two serially connected scrubbing chambers, each scrubbing chamber having at least one nozzle and one scrubber liquid withdrawal pipe for withdrawing the used scrubber liquid out of the respective scrubbing chamber In an embodiment of a marine exhaust flue gas desulphurization system according to the application, the marine exhaust flue gas desulphurization system comprises a scrubber liquid pipe arranged to transport scrubber liquid to the spraying nozzles provided in the scrubber tower, the scrubber liquid pipe comprising a cooler arranged to cool the scrubber liquid that is conveyed towards the spraying nozzles.

In a possible embodiment of a marine exhaust flue gas desulphurization system according to the application, the scrubber liquid pipe further is arranged to transport and recycle scrubber liquid from the used scrubber liquid tank to the spraying nozzles when the wet scrubber system is operating in the closed loop mode.

In an embodiment of a marine exhaust flue gas desulphurization system according to the application, the marine exhaust flue gas desulphurization system further comprises a filter unit to filter the used scrubber liquid.

According to a second aspect of the application, a method for reducing the amount of sulphur oxides present in an exhaust flue gas of a diesel engine of a marine vessel is disclosed, the method comprising the steps of conveying exhaust flue gases created in the diesel engine of the marine vessel to a wet scrubber system that is running in a closed loop mode;

scrubbing the exhaust flue gases in the wet scrubber system using a scrubber liquid thereby forming a used scrubber liquid;

preparing a magnesium hydroxide slurry by adding magnesium oxide powder and water to a preparation reservoir under agitating conditions;

transporting the prepared magnesium hydroxide slurry to the wet scrubber system via slurry transporting means; and;

contacting the magnesium hydroxide slurry with the used scrubber liquid thereby cleaning the used scrubber liquid and/or neutralizing the acidity thereof.

In a particular embodiment of a method according to the application, the method further comprises the steps of:

(a) continuously agitating the magnesium hydroxide slurry in the preparation reservoir using agitation means under the control of agitating control means as long as the level of the magnesium hydroxide slurry indicated by pressure transmitter means is above a predetermined level;

(b) gradually adding the magnesium oxide powder to the preparation reservoir by the powder transportation and addition means under the control of transportation and addition control means; and/or (c) adding water to the preparation reservoir using water addition means under the control of water addition control means in case the temperature of the prepared magnesium hydroxide slurry in the preparation reservoir measured by temperature transmitter means increases above a pre-set temperature limit.

In a possible method according to the application, the prepared magnesium hydroxide slurry is pumped out of the preparation reservoir into a storage reservoir via a slurry withdrawal pipe using pumping means.

Particularly, used scrubber liquid is withdrawn from the wet scrubber via one of more used scrubber liquid withdrawal pipes and transported to a used scrubber liquid tank via a closed loop mode scrubber liquid recycle pipe when the wet scrubber system is operating in closed loop mode, and wherein magnesium hydroxide slurry from the storage reservoir is brought into contact with the used scrubber liquid, in the closed loop mode scrubber liquid recycle pipe via slurry transporting pipes forming part of the slurry transporting means.

In an optional method according to the application, the magnesium hydroxide slurry is pumped out of the storage reservoir into the closed loop mode scrubber liquid recycle pipe via the slurry transporting pipes using pumping means.

In a possible method according to the application, the method is performed using a marine exhaust flue gas desulphurization system according to the application as described above.

DETAILED DESCRIPTION OF THE APPLICATION

The skilled person reading the description below will understand that when an element such as a pipe, a pump, a valve, an intake, an outlet, a tank, a reservoir, a nozzle etc. is mentioned in singular form, the mentioned element may be in plural form, i.e. two or more elements may be present if not explicitly excluded. Accordingly, when a pipe is mentioned, the expression may also include two or more pipes arranged in parallel or in series. This is also applicable to all the mentioned elements.

Figure 1:
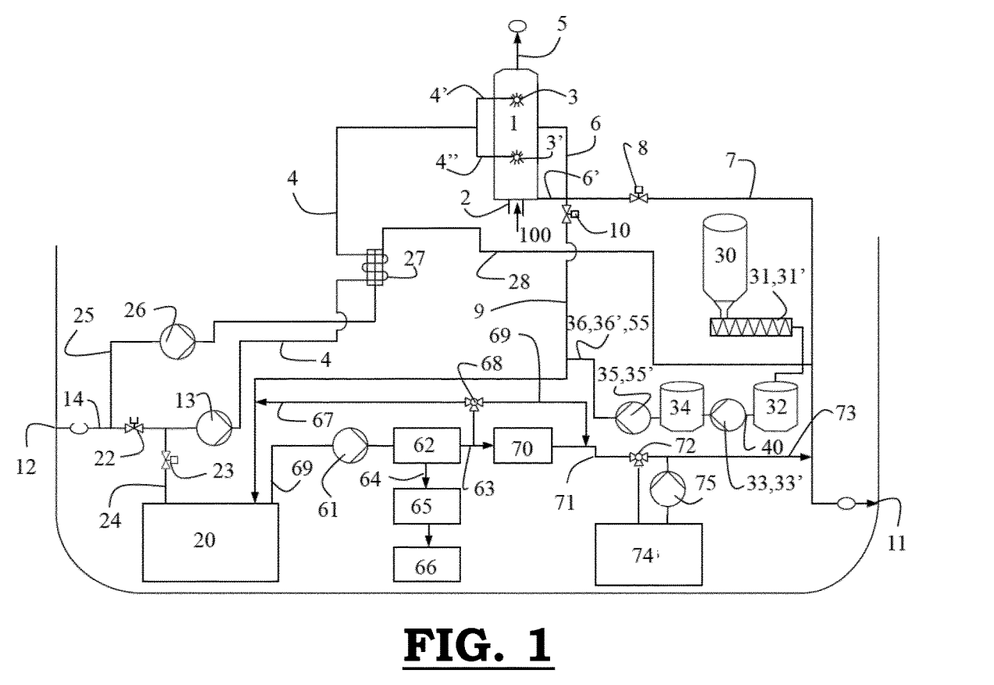
FIG. 1 illustrates a schematic overview of a particular embodiment of a marine exhaust flue gas desulphurization system including a wet scrubber system for treating exhaust flue gas of one or more diesel engines of a marine vessel and treatment of the recycled used scrubber liquid by means of Mg(OH)$_2$-slurry.

As can be seen in FIG. 1, the exhaust flue gas (100) produced by one or more diesel engines (not shown in FIG. 1) of the marine vessel is introduced into the bottom part of a wet scrubber (1) via a flue gas exhaust pipe (2). The wet scrubber (1) specifically is a wet scrubber without a packing. The wet scrubber (1) comprises a scrubbing tower having a multiplicity of spraying nozzles (3, 3') that each are arranged for spraying the scrubber liquid into the scrubbing tower in order to be brought into contact with the exhaust flue gas. The spray nozzles (3, 3') are arranged for a maximum contact between droplets of the scrubber liquid exiting from the spray nozzles (3, 3') and the exhaust flue gas passing through the wet scrubber tower. The scrubber liquid is introduced into the spray nozzles (3) via scrubber liquid sub pipes (4', 4"). The scrubber liquid sub pipes (4', 4") are connected to a scrubber liquid main pipe (4). The scrubbed exhaust flue gas is released into the surroundings via a scrubbed exhaust gas outlet pipe (5).

Used scrubber liquid is collected in the wet scrubber (1) and is withdrawn through used scrubber liquid withdrawal pipe(s) (6, 6'). The wet scrubber (1) as shown in FIG. 1 is more particularly a two-step wet scrubber having two serially connected scrubbing chambers (not shown on FIG. 1), wherein each of the scrubbing chambers has one spray nozzle (3, 3') and one scrubber liquid withdrawal pipe (6, 6'). The scrubber liquid in the scrubber liquid withdrawal pipes (6, 6') is collected and further led through an open loop mode outlet pipe (7) that is controlled by a valve (8), or through a closed loop mode scrubber liquid recycle pipe (9) that is controlled by a valve (10). Accordingly, in particular embodiments, the marine exhaust flue gas desulphurization system as described herein is configured for being able to run in an open as well as a closed loop mode.

In the open loop mode of the wet scrubbing system, the valve (10) is closed and the valve (8) is open, such that the used scrubber liquid is withdrawn through the outlet pipe (7) and is released into the surrounding sea via a water outlet (11). In the open loop mode, seawater is taken in from the surrounding sea via a seawater inlet (12), a seawater pipe (14), via a valve (22), a scrubber liquid pump (13) and introduced into the scrubber liquid pipes (4, 4', 4"). In the open loop mode, the valve (22) is open.

In the closed loop mode of the wet scrubbing system—which is mandatory in certain waters such as the Baltic Sea where it is prohibited to release the used scrubber liquid into the surroundings—the valve (8) is closed, and valve (10) is open, such that the used scrubber liquid is led through the closed loop mode scrubber liquid recycle pipe (9) and is introduced into a used scrubber liquid tank (20), which in the closed loop mode serves as a scrubber liquid reservoir. In the closed loop mode, the recycle valve (23), which is arranged on the scrubber liquid recycle pipe (24) for recycling of scrubber liquid from the used scrubber liquid tank (20), is opened. Consequently, the scrubber liquid in the tank (20) is recycled via the recycle pipe (24), the valve (23) and the pump (13) into the scrubber liquid pipes (4, 4', 4"). The valve (22) is in the closed loop mode controlled to balance any loss of scrubber liquid in the recycled scrubber liquid.

In the closed loop mode, the recycling scrubber liquid is heated by the hot exhaust gas in the wet scrubber (1). To avoid reduced scrubbing efficiency due to heating, a cooler (27) may be arranged in scrubber liquid pipe (4) to cool the scrubber liquid. The cooler (27) receives cooling water from the seawater inlet (12) via a cooling water pipe (25) and a cooling water pump (26). Cooling water is withdrawn from the cooler (27) in a cooling water return pipe (28), and is released to the surrounding via the seawater outlet (11). The skilled person will understand that the mentioned seawater outlet (11) may be one or more outlet(s), each for releasing one or more water streams into the surrounding sea.

In order to clean and/or to neutralize the acidity of the used scrubber liquid in the closed loop mode of the wet scrubber system, a $Mg(OH)_2$-slurry is added to the used scrubber liquid. In order to form this $Mg(OH)_2$-slurry, MgO-powder is agitated with water in a preparation reservoir (32). The $Mg(OH)_2$-slurry is formed by the hydrolysis of the MgO-powder with water. The water can be fresh water or can be seawater with an emulsifier. The emulsifier used can be any suitable emulsifier known in the art stabilizing seawater and thus not resulting in sediment.

MgO-powder can be brought on-board of the marine vessel either in big-bags (30) or in silo's (39).

Big bags (30) are commonly used for delivery of dry matter in different technical areas, and may have a capacity up to 1000 kg, or more. The big bags (30) used in the present application more in particular have a capacity of more than 500 kg. The big bags (30) have a big bag spout (not shown on FIG. 2) in the bottom thereof. A big-bag connection clamp (not shown on FIG. 2) can be provided to eliminate dust emissions, loss of powder or contamination of the powder.

Figure 2:
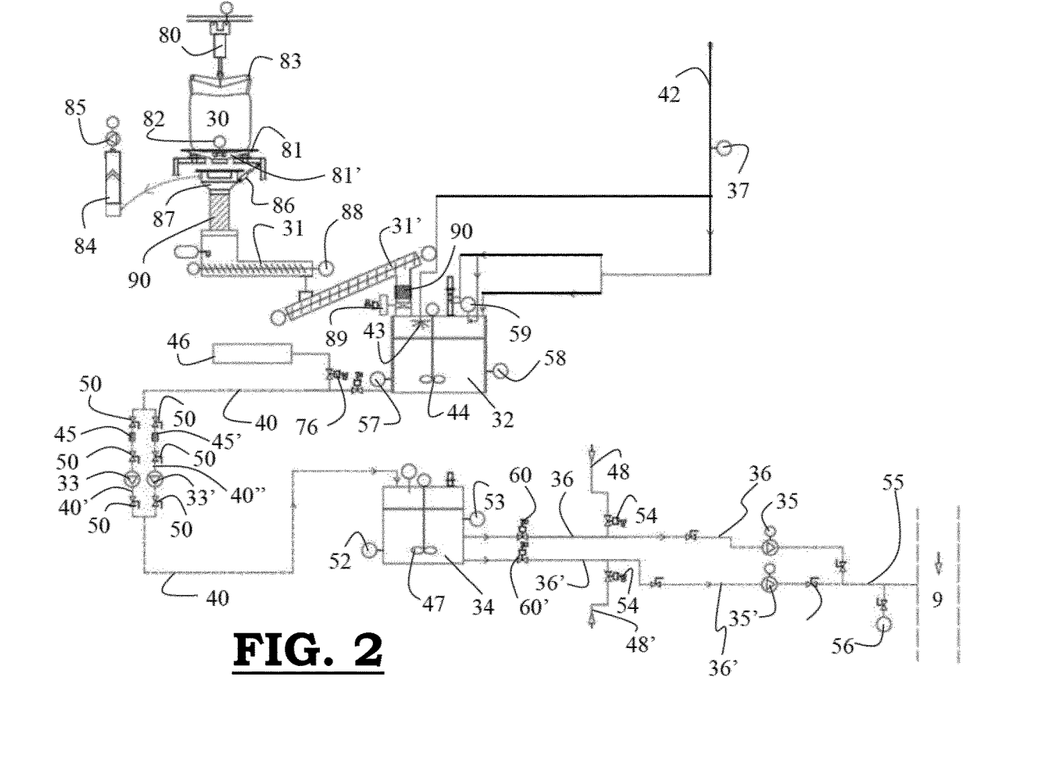
FIG. 2 illustrates a particular embodiment of a powder feeding and mixing system for MgO-powder delivered in big bags.

As can be seen in FIG. 2, a hoisting device (80) is provided using more in particular a yoke (83) for lifting the big bag (30) and bringing it in the correct position to rest onto a support cone (81') arranged as a support for the big bag (30) and for assisting in emptying the big bag (30). This support cone (81') forms part of a big bag discharger (81). Furthermore, a vibrator (82) can be arranged to vibrate the big bag (30) if MgO-powder would get stuck in the big bag (30), and to get all or most MgO-powder out of the big bag (30). Furthermore, a big bag connector (87) is provided to connect the big bag spout to it.

The big bag discharger (81) can be supplied with a pneumatic air cleaned dust filter (84) with a fan (85). The dust filter (84) is installed to avoid that powder dust would enter the surrounding area when a big bag (30) is replaced. The fan (85) is used when an empty big-bag (30) is removed and evacuates the air in the empty big bag (30). Furthermore, a pneumatic cylinder (86) can be provided to raise and lower the big bag connector (87) such that the big bag spout can easily be connected to it.

Figure 3:
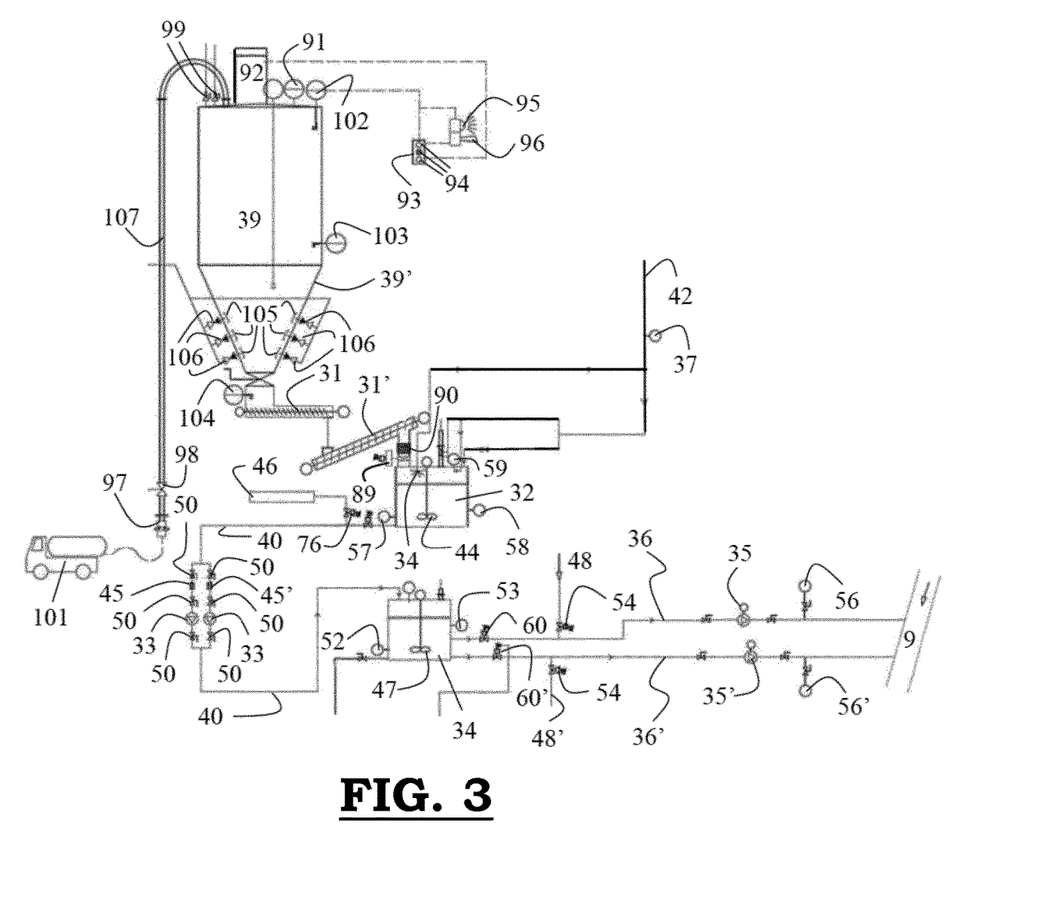
FIG. 3 illustrates a particular embodiment of a powder feeding and mixing system for bulk delivery of MgO-powder and storage on-board in a silo.

When storing MgO-powder in a silo (39) on-board of the marine vessel, the capacity of the silo(s) (39) is (are) limited by the weight and space limitations on-board the marine vessel. In FIG. 3, such a silo (39) is demonstrated. It should be clear that the application is not restricted to a silo (39) as a reservoir for holding the MgO-powder, but also other types of reservoirs such as tanks can be used.

As can be seen in FIG. 3, the MgO-powder is pumped out of a bulk truck (101) to the silo (39) using the compressor on the bulk truck (101) via a filling pipe (107) that is connected to the silo (39). This filling pipe (107) is provided with a hose valve (98) that is more in particular pneumatically operated. This hose valve (98) can be opened or closed. The filling pipe (107) can furthermore be arranged with a ring ejector (97) that avoids clogging of powder in the filling pipe (107). Once the higher pressure builds up in the filling pipe (107), the ring ejector (97) will automatically start and boost the powder filling capacity of the silo (39). To increase the filling speed of the powder throughout the filling pipe (107), the ring ejector (97) adds pressurized air to the transported powder. The ring ejector (97) thus helps the transportation through a long vertical filling pipe (107) and helps to ensure the transport throughout the filling pipe (107).

In order to set a pressure of 40 mbar inside the silo (39), a pressure transmitter (91) is mounted inside the silo (39). A high pressure alarm can be produced by the pressure transmitter (91) to indicate that the pressure limit of 40 bar inside the silo (39) is reached. A high pressure will close the hose valve (98) and the filling of the silo (39) will be stopped at that moment. The one or more pressure relief valves (99) on top of the silo (39) are arranged to open at 50 mbar and are provided to protect the silo (39) in case the pressure increase inside the silo (39) is too high. The hose valve (98) closes at a high pressure inside the silo (39) or when the silo (39) is full.

At the top of the silo (39), a dust filter (92) can be installed to prevent dust being released into the surrounding while filling the silo (39). The air which is used for transporting the MgO-powder from the bulk truck (101) to the silo (39) is released via this dust filter (92).

During the filling of the silo (39), a control box (93) with manoeuvre buttons and indicator lamps (94) can be used. A number of level indicators indicating a certain level of the powder in the silo (39) can be provided. To indicate a full level of the silo (39), a full level silo indicator (102) can be provided. To indicate a low level of the silo (39), a low level silo indicator (103) can be provided. To indicate an arch or empty level of the silo (39), an arch or empty level silo indicator (104) can be provided. The full level silo indicator (102) activates an alarm produced by a horn (96) as well by a flash light (95) and activates a stop filling sequence meaning that the operator needs to stop filling the silo (39). The low level silo indicator (103) activates a low level alarm when the MgO-powder in the silo (39) is lower than a specified level indicated in the parameter list of the silo (39). The arch or empty level indicator (104) is located at the back of the upper multi-screw conveyor (31) and it indicates that the silo (39) is empty. When the arch or empty level indicator (104) is activated, an arch breaking system starts an arch breaking sequence, meaning that the arch build-up in the bottom cone (39') of the silo (39). As can be seen on FIG. 3, the arch breaking system comprises a number of nozzles (105), more in particular plate nozzles (105), that are provided in the bottom cone (39') of the silo (39). Each of the plate nozzles (105) is controlled by a respective non-return valve (106). In the arch breaking sequence, the non-return valves (106) are opened and compressed air in the form of a pulse will be sent to the bottom cone (39') of the silo (39) through the plate nozzles (105) to break the arch.

To convey the magnesium oxide powder from a big bag (30) or a silo (39) towards the preparation reservoir (32) and to add this powder in the preparation reservoir (32), powder transportation and addition means (31, 31') (see FIGS. 2 and 3) are provided. In this application, the powder transportation and addition means more particularly comprise a multi-screw feeder (31) that is located above a multi-screw conveyor (31'). The multi-screw feeder (31) has a large active discharge area and helps to discharge the magnesium oxide powder in a reliable way to the multi-screw conveyor. Both are arranged to be started and stopped at any time during the process of adding the magnesium oxide powder to the preparation reservoir (32). More in particular, the multi-screw feeder (31) runs at a constant speed which will be set during the commissioning phase. In this application, the multi-screw feeder (31) has a capacity of approximately 500 kg/hr. A rotation indicator (88) can be arranged to monitor the rotation speed of the multi-screw feeder (31). An alarm level can be set in the operation program for indicating a low rotation speed of the multi-screw feeder (31) for a period of more than one second and for the multi-screw conveyor (31') in case there is a low rotation speed for a period of more than 60 ms. The multi-screw conveyor (31') can be arranged to run when a butterfly valve (89), that is provided on a (flexible) connection (90) that forms a connection between the outer end of the multi-screw conveyor (31') and the preparation reservoir (32), is in an open position. This butterfly valve (89) is provided to prevent moisture from the preparation reservoir (32) to reach up into the multi-screw conveyor (31'). The butterfly valve (89) is more in particular arranged to operate automatically.

Furthermore, powder transportation and addition means control means (not shown in FIG. 1) are provided to control that the powder transportation and addition means (31, 31') gradually add magnesium oxide powder to the preparation reservoir (32), this in order to avoid overheating due to the exothermal reaction between the magnesium oxide powder and water. The preparation reservoir (32) may be provided with an insulation. Furthermore, as can be seen in FIG. 2, in order to add water, more particularly fresh water or seawater with an emulsifier, to the preparation reservoir (32), water addition means, in particular a fresh water pipe (42), are provided. In order to measure the flow of the water added into the preparation reservoir (32), a flow meter (37) may be provided. The magnesium oxide powder and the water are more in particular added simultaneously to the preparation reservoir (32).

Depending upon the concentration of the magnesium hydroxide slurry, meaning MgO wt % and water wt % of the slurry, a range of between 20 and maximum 30 weight % of MgO-powder and between 80 and minimum 70 weight % of water are added together in the preparation reservoir (32).

As can be seen in FIG. 2, in order to agitate the MgO-powder with the water, agitation means (44), more particularly in the form of a stirrer, are provided. These agitation means (44) are particularly provided inside the preparation reservoir (32). These agitation means (44) more particularly agitate continuously as long as the level of the magnesium hydroxide slurry is above a predetermined minimum level.

In order to indicate the actual level of the magnesium hydroxide slurry in the preparation reservoir (32), pressure transmitter means (57) (see FIG. 2) are provided. Agitation control means (not shown in the figures) are provided that are configured to control the agitation means (44) to continuously agitate the $Mg(OH)_2$-slurry prepared in the preparation reservoir (32) as long as the pressure transmitter means (57) indicate that the level of the magnesium hydroxide slurry is above a predetermined minimum level.

Since magnesium oxide powder is only slightly soluble in water, and the hydration reaction of this powder in water is an exothermal process, if the temperature increases above a pre-set temperature limit, the addition of the powder is stopped, and additional water is added to the preparation reservoir (32) via water addition means such as a water addition pipe (42) in order to avoid overheating (see FIGS. 2 and 3). The addition of the powder is restarted and water is added at a pre-defined rate, as soon as the temperature is below a second pre-set temperature limit. These pre-set temperature limits can be 70° C., 75° C. or 80° C., more particularly 75° C. As can be seen in FIGS. 2 and 3, the preparation reservoir (32) is provided with a temperature transmitter (58) to measure the temperature inside the preparation reservoir (32). Water addition control means (not shown in the figures) are provided to control the water addition means (42) to add water into the preparation reservoir in case the temperature transmitter (58) measures a temperature of the prepared $Mg(OH)_2$-slurry increases above a pre-set temperature limit.

An overfilling level switch (59) controls the maximum level in the preparation reservoir (32) by giving a signal to the powder transportation and addition means control means and the water addition control means to stop the addition of powder by the multi-screw conveyors (31, 31') and the addition of the water in the preparation reservoir (32).

As can furthermore be seen in FIG. 2, at the output end of the multi-screw conveyors (31, 31'), dust arrestor means (43) can be arranged to reduce the formation of magnesium oxide powder dust caused by the introduction of the powder into the preparation reservoir (32). The dust arrestor means (43) comprises one or more spray nozzles for forming a fresh water spray to humidify the magnesium oxide powder dust formed, and thus to capture the magnesium oxide and/or magnesium hydroxide dust and allow the humidified magnesium oxide and/or magnesium hydroxide dust to fall into the preparation reservoir (32). The fresh water for the dust arrestor means (43) is conveniently a side stream taken from the fresh water pipe (42).

The magnesium hydroxide slurry that is prepared in the preparation reservoir (32) is then withdrawn from the preparation reservoir (32) into a storage reservoir (34) via slurry transporting means that comprise a slurry withdrawal pipe (40) and two slurry withdrawal sub pipes (40', 40"). The slurry withdrawal sub pipes (40', 400") are placed in parallel. The slurry withdrawal pipe parts (40, 40') are provided with different valves (50) that are arranged to control the flow of the magnesium hydroxide slurry therein. The slurry withdrawal pipe parts (40, 40') come back together to one slurry withdrawal pipe (40) after the pumps (33, 33'). As can be seen in FIGS. 1 to 3, the storage reservoir (34) is placed in series with the preparation reservoir (32).

Pumping means (33, 33') are used to pump the $Mg(OH)_2$-slurry out of the preparation reservoir (32) into the storage reservoir (34). This is particularly an automatic process. The pumping means more in particular comprise two pumps (33, 33') that are placed in parallel. One of the two pumps (33, 33') is on duty, while the other one (33', 33) will be standby. In case a problem such as clogging of one of the slurry withdrawal sub pipes (40', 40") or damage to the pumps (33, 33') would occur, the other of the two pumps (33, 33') can be switched on. Therewith, manual valves (not shown on FIG. 2) will have to be set in the correct position to enable the change of the operation modus of the pumps (33, 33').

As can be seen in FIGS. 2 and 3, before each of the pumps (33, 33'), a respective filter (45, 45') is provided in order to remove particles of the magnesium hydroxide slurry that are large enough to damage the pumps (33, 33').

The slurry withdrawal pipe (40) is furthermore connected to a flush water pipe (46) that is provided to flow water through it for flushing the pumps (33, 33'), the filters (45, 45'), the valves (50) and the slurry withdrawal pipe (40) and slurry withdrawal sub pipes (40', 40").

As can be seen in FIGS. 2 and 3, also the storage reservoir (34) is provided with agitation means (47), particularly in the form of a stirrer, to agitate the magnesium hydroxide slurry that is contained therein in order to keep the magnesium hydroxide slurry properly mixed with the water and avoid sedimentation of the slurry to the bottom of the storage reservoir (34). The agitation means (47) agitate as long as the level of the magnesium hydroxide slurry is above a predetermined level. Pressure transmitter means (52) are arranged to determine the actual level of the magnesium hydroxide slurry in the storage reservoir (34). Agitation control means (not shown on the figures) are provided configured to control the agitation means (47) to agitate the $Mg(OH)_2$-slurry as long as the level of the magnesium hydroxide level as measured by the pressure transmitter means (52) is above a predetermined level. Furthermore, temperature transmitter means (53) are arranged to monitor the temperature inside the storage reservoir (34). In case of a too high temperature due to a too high concentration of magnesium hydroxide, the valve (76) is opened and fresh water will be added to decrease the temperature in the storage reservoir (34) to a pre-set temperature limit. These pre-set temperature limit can be 70° C., 75° C. or 80° C., more particularly 75° C.

In FIG. 1, it is shown that the storage reservoir (34) is connected to the closed loop mode scrubber liquid recycle pipe (9) via slurry transporting means (36, 36', 55) and pumping means (35, 35'). In FIGS. 2 and 3, it can be seen that the slurry transporting means more particularly comprise slurry transporting pipes comprising more in particular two slurry transporting sub pipes (36, 36') that are placed in parallel, and optionally a slurry transporting main pipe (55) that is placed in series with each of the slurry transporting sub pipes (36, 36'). In FIG. 2, the slurry transporting pipes (36, 36') come together to one slurry transporting main pipe (55) that is arranged with a pressure transmitter (56). This slurry transporting main pipe (55) is in its turn connected to the closed loop mode scrubber liquid recycle pipe (9). In FIG. 3, each of the two slurry transporting sub pipes (36, 36') are connected to the closed loop mode scrubber liquid recycle pipe (9).

Furthermore, the pumping means more particularly comprise two dosing pumps (35, 35') that are placed in parallel and that each are placed on a respective slurry transporting sub pipe (36, 36'). The dosing pumps (35, 35') are in particular frequency controlled dosing pumps to dose the magnesium hydroxide slurry to the closed loop mode scrubber liquid recycle pipe (9).

Each of the slurry transporting sub pipes (36, 36') is furthermore connected to a flush water pipe (48, 48') that is provided to flow water through it for flushing the slurry transporting sub pipes (36, 36') and the dosing pumps (35, 35'), as well as the main slurry transporting pipe (55) as shown in FIG. 2. On these flush water pipes (48, 48'), a flushing valve (54, 54') is provided.

Each of the slurry transporting sub pipes (36, 36') are furthermore provided with a valve (60, 60') that is opened as soon as the wet scrubber system switches to the closed loop mode or starts in a closed loop mode. The dosing pumps (35, 35') are arranged to stop if the wet scrubber system stop working. As soon as the dosing pumps (35, 35') stop feeding the magnesium hydroxide slurry to the closed mode scrubber liquid recycle pipe (9), the dosing pumps (35, 35'), the slurry transporting sub pipes (36, 36') and the slurry transporting main pipe (55) need to be flushed to avoid sedimentation and clogging in these elements. This is done by opening each of the flushing valves (54, 54').

After the dosing pumps (35, 35'), one or more pressure transmitters (56, 56') can be provided to stop the dosing pumps (35, 35') in case of a too high pressure. In FIG. 2, one pressure transmitter (56) is provided in the slurry transporting main pipe (55), while in FIG. 3, in each of the slurry transporting sub pipes (36, 36'), such a pressure transmitter (56, 56') is provided.

The magnesium hydroxide slurry is added to the used scrubber liquid in the closed loop mode scrubber liquid recycle pipe (9) according to the need to maintain the scrubbing efficiency and the $SO_x$ removal capacity of the (used) scrubber liquid. The pH of the used scrubber liquid is preferably adjusted to a pH between 5 and 6.

The scrubber liquid that is recycled during the closed loop mode of the scrubber system will contain increasing concentrations of solid matter, mainly soot and residues of unburned fuel, mainly polyaromatic hydrocarbons (PAH). The increasing amount of particulate material sets a maximum period for operation in closed loop mode. To remove particulate material from circulation and thus to extend the period during which used scrubber liquid can re-used by the scrubber system, a part of the used scrubber liquid present in the used scrubber liquid tank (20) is withdrawn in a scrubber liquid withdrawal pipe (69) and a scrubber liquid withdrawal pump (61) to a filter unit (62). There are different known filter techniques available for this purpose. A particular filter unit comprises a pre-filter for removing coarse particulate matter, such as a dead end filter particle (for instance having a size of >1000 μm, or >800 μm), and a filter for removal of the finer particles (for instance with a pore size of the ceramic filter of 0.04 μm). The scrubbing water is filtered in the pre-filter to remove particles of a size that may cause problems in downstream filters.

The filter for removing the pre-filtered scrubber liquid may be a ceramic SiC membrane filter unit, composed of 2 stages (or recirculation loops) that can be operated more or less independent of each other. Each loop contains several, such as 4, ceramic SiC membranes mounted in parallel with a total membrane filtration area of several square meters. The pre-filtered scrubber liquid is pumped into the membrane stages with a common feed pump, which has the additional function of pressurizing the stages and establishing a transmembrane pressure across the membrane. Recirculation pumps furthermore circulate the water inside the recirculation loops and thereby create high turbulence on the membrane surface to prevent particle deposition. The membrane system is capable of carrying out fully automated back flushes, back pulses and chemical cleaning cycles (CIP) in regular intervals according to sequences that have been programmed in the PLC of the system. These techniques are used to remove any flocculants that will accumulate on the membrane surface with increasing filtration time.

The filtering and cleaning of the used scrubber liquid, and the dewatering of the filter cake allows safe and clean on-board handling and storage of the filter cake.

The used scrubber liquid is divided into two streams by the filter unit (62). The two streams leave the filter unit (62) continuously. The stream that passes through the filter unit (62) is purified and is withdrawn via a purified water withdrawal pipe (63). The liquid withdrawn in the purified water withdrawal pipe (63) represents typically about 90-95% of the scrubbing liquid fed into the filter unit (62).

The retentate from the filter unit (62) containing the majority of the particles and PAH, and the concentration of solids in the retentate stream is concentrated by a factor of 10 to 20, to about 0.5 to 1.0% by weight of solids. The retentate is withdrawn from the filter unit in a retentate pipe (64), and introduced into a dewatering unit (65). In the dewatering unit (65), the pH of the retentate is adjusted to a pH between 6 and 8, if needed, by addition of alkali or acid, and a surface active polymer. The surface active polymers cross links particles in the suspension with each other, creating a flocculated suspension including large particle agglomerates that can be more easily dewatered. The retentate is then introduced into a dewatering press (66). As a dewatering press (66) a screw or filter press can be used, into which the flocculated suspension is transported from the mixing chamber into the dewatering section of the press by a transporting screw. While water can leave the dewatering section through slots, the particle agglomerates are retained and increasingly compressed the more they move towards the end of the transporting screw, from where they finally fall into a sludge drum. The screw press is expected to produce a sludge amount of about 10-20 kg/h with a dry solids content in the range of 10-30 wt % as well as a reject water steam (about 500 l/h) that can either be discharged overboard or recycled back to the used scrubber liquid tank (20).

The purified water in pipe (63), or parts thereof, may be recycled back to the used scrubber liquid tank (20) via a purified water return pipe (67), and/or withdrawn from the recycling of the scrubber liquid. The purified water withdrawn from the recycling of scrubber liquid may be introduced into a granular activated carbon filter (70) to remove or substantially reduce the amount of PAH in the filtered water before introducing the water into a waste water pipe (71). Alternatively, the purified water may be introduced directly into the waste water pipe (71) via a bypass pipe (69). The flow of the water in pipe (63) into pipe (67), pipe (69) or the carbon filter (70) is controlled by a valve (68) depending of the need for recycled water into used scrubber liquid tank (20), and/or environmental requirements.

Depending on the environmental requirement, the purified water in pipe (63) may be released into the surrounding sea as it is, or temporary deposited into a waste water tank (74), as controlled by valve (72). The waste water tank (74) may be emptied in harbor, or into the sea in waters where it is allowed to dump waste water. A pump (75) is arranged to pump waste water from the waste water tank (74) into a waste water release pipe (73) connected to the water outlet (11).

A possible wet scrubber to be used in connection with the present application is a wet scrubber as described in WO 2014/128261, but the present application is not bound to any specific wet scrubber design.

The invention claimed is:

1. A marine exhaust flue gas desulphurization system for reducing the amount of sulphur oxides present in an exhaust flue gas of one or more diesel engines of a marine vessel, the marine exhaust flue gas desulphurization system being configured for being able to run in an open and in a closed loop mode, comprising:
    a wet scrubber system comprising at least one wet scrubber (1) arranged for scrubbing the exhaust flue gases originating from the diesel engine of the marine vessel using a scrubber liquid, thereby generating a used scrubber liquid, wherein the wet scrubber comprises one or more used scrubber liquid withdrawal pipes (6, 6') for withdrawing the used scrubber liquid from the wet scrubber (1), wherein the one or more used scrubber liquid withdrawal pipes (6, 6') are connected to an open loop outlet pipe (7) controlled by a first valve (8) and to a closed loop mode scrubber liquid recycle pipe (9) that is controlled by a second valve (10);

at least one preparation reservoir (32) arranged for preparing a magnesium hydroxide slurry by hydrolysis of magnesium oxide powder with water, the preparation reservoir (32) comprising water addition means (42), magnesium oxide powder addition means (31, 31') and agitation means (44) for mixing the water and the magnesium oxide powder;

slurry transporting means (40, 40', 40", 36, 36', 55) connected to the one or more used scrubber liquid withdrawal pipes (6, 6') or to the closed loop mode scrubber liquid recycle pipe (9), for transporting the prepared magnesium hydroxide slurry from the at least one preparation reservoir (32) towards the used scrubber liquid withdrawn from the wet scrubber (1) in the one or more used scrubber liquid withdrawal pipes (6, 6') or the closed loop mode scrubber liquid recycle pipe (9), which, when the marine exhaust gas desulphurization system is configured to run in closed loop mode, is configured for contacting the magnesium hydroxide slurry with the used scrubber liquid in order to clean the used scrubber liquid and/or to neutralize the acidity thereof;

wherein the one or more used scrubber liquid withdrawal pipes (6, 6') are configured to withdraw the used scrubber liquid from the wet scrubber via a closed loop mode scrubber liquid recycle pipe (9) towards a used scrubber liquid tank (20) when the wet scrubber system is operating in closed loop mode; and wherein the preparation reservoir (32) comprises temperature transmitter means (58) to measure the temperature inside the preparation reservoir (32), and comprises water addition control means configured to control the water addition means (42) to add water into the preparation reservoir (32), in case the temperature transmitter means (58) measure a temperature of the prepared magnesium hydroxide slurry that increases above a pre-set temperature limit.

2. Marine exhaust flue gas desulphurization system according to claim 1, wherein the marine exhaust gas desulphurization system comprises a storage reservoir (34) that is placed in series with the preparation reservoir (32) and that is connected to the preparation reservoir (32) via a slurry withdrawal pipe (40).

3. Marine exhaust flue gas desulphurization system according to claim 2, wherein the slurry withdrawal pipe (40) is arranged with slurry pumping means (33, 33') for pumping the slurry out of the preparation reservoir (32) into the storage reservoir (34) and slurry transporting pipes (36, 36', 55) are arranged with slurry pumping means (35, 35') for pumping the slurry out of the storage reservoir (34) towards the closed loop mode scrubber liquid recycle pipe (9).

4. Marine exhaust flue gas desulphurization system according to claim 3, wherein the marine exhaust flue gas desulphurization system further comprises flushing means (46) for flushing the slurry pumping means (33, 33', 35, 35') and all pipes through which slurry flows (36, 36', 55, 40, 40', 40") after the slurry pumping means (33, 33', 35, 35') stopped pumping slurry.

5. Marine exhaust flue gas desulphurization system according to claim 2, wherein the storage reservoir (34) comprises agitation means (47) for agitating the magnesium hydroxide slurry that is contained in the storage reservoir (34).

6. Marine exhaust flue gas desulphurization system according to claim 2, wherein the preparation reservoir (32) and the storage reservoir (34), comprise pressure transmitter means (57 and 52) for indicating the actual level of the magnesium hydroxide slurry in the preparation reservoir (32) and the storage reservoir (34), respectively, and comprises agitation control means that are configured to control the agitation means (44 and 47) to continuously agitate the magnesium hydroxide slurry prepared in the preparation reservoir (32) and the storage reservoir (34), respectively, as long as the pressure transmitter means (57 and 52, respectively) indicate that the level of the magnesium hydroxide slurry is above a predetermined minimum level.

7. Marine exhaust flue gas desulphurization system according to claim 1, wherein the slurry transporting means comprise slurry transporting pipes (36, 36', 55) for withdrawing the magnesium hydroxide slurry from the preparation reservoir (32) and/or a storage reservoir (34) via the closed loop mode scrubber liquid recycle pipe (9) towards a used scrubber liquid tank (20), when the wet scrubber system is operating in closed loop mode.

8. Marine exhaust flue gas desulphurization system according to claim 1, wherein the water added to the magnesium oxide powder to prepare the magnesium hydroxide slurry is fresh water or seawater with an emulsifier.

9. Marine exhaust flue gas desulphurization system according to claim 1, wherein the preparation reservoir (32) comprises a flow meter (37) for measuring the flow of the water that is added to the preparation reservoir (32) water addition means (42).

10. Marine exhaust flue gas desulphurization system according to claim 1, wherein the preparation reservoir (32) comprises magnesium oxide powder addition control means configured to control the magnesium oxide powder addition means (31, 31') to gradually add magnesium oxide powder to the preparation reservoir (32).

11. Marine exhaust flue gas desulphurization system according to claim 1, wherein the magnesium oxide powder addition means comprise powder transportation and addition means comprising one or more multi-screw conveyors (31, 31') that are controlled by the transportation and addition control means configured to start and to stop the one or more multi-screw conveyors (31, 31') at any time during the process of adding the magnesium oxide and/or magnesium hydroxide to the preparation reservoir (32).

12. Marine exhaust flue gas desulphurization system according to claim 1, wherein the marine exhaust flue gas desulphurization system further comprises dust arrestor means (43) that comprise a dust arrester pipe connected with the preparation reservoir (32) and comprising water spraying means arranged to spray water into the dust arrester pipe.

13. Marine exhaust flue gas desulphurization system according to claim 1, wherein the wet scrubber (1) is a scrubber of the spraying type without a packing, and wherein the wet scrubber (1) comprises a scrubbing tower having a multiplicity of spraying nozzles (3, 3') that each are arranged for spraying the scrubber liquid into the scrubbing tower in order to be brought into contact with the exhaust flue gas, the scrubbing tower optionally comprising two serially connected scrubbing chambers, each scrubbing chamber having at least one nozzle (3, 3') and one scrubber liquid withdrawal pipe (6, 6') for withdrawing the used scrubber liquid out of the respective scrubbing chamber.

14. Marine exhaust flue gas desulphurization system according to claim 13, wherein the marine exhaust flue gas desulphurization system further comprises a scrubber liquid pipe (4) arranged to transport scrubber liquid to the spraying nozzles (3, 3') provided in the scrubber tower, the scrubber liquid pipe (4) comprising a cooler (27) arranged to cool the scrubber liquid that is conveyed towards the spraying nozzles (3, 3').

15. Marine exhaust flue gas desulphurization system according to claim 14, wherein the scrubber liquid pipe (4) further is arranged to transport and recycle scrubber liquid from the used scrubber liquid tank (20) to the spraying nozzles (3, 3') when the wet scrubber system is operating in the closed loop mode.

16. Marine exhaust flue gas desulphurization system according to claim 1, wherein the marine exhaust flue gas desulphurization system further comprises a filter unit (62) to filter the used scrubber liquid.

17. A marine exhaust flue gas desulphurization system for reducing the amount of sulphur oxides present in an exhaust flue gas of one or more diesel engines of a marine vessel, the marine exhaust flue gas desulphurization system being configured for being able to run in an open and in a closed loop mode, comprising:
- a wet scrubber system comprising at least one wet scrubber (1) arranged for scrubbing the exhaust flue gases originating from the diesel engine of the marine vessel using a scrubber liquid, thereby generating a used scrubber liquid, wherein the wet scrubber comprises one or more used scrubber liquid withdrawal pipes (6, 6') for withdrawing the used scrubber liquid from the wet scrubber (1), wherein the one or more used scrubber liquid withdrawal pipes (6, 6') are connected to an open loop outlet pipe (7) controlled by a first valve (8) and to a closed loop mode scrubber liquid recycle pipe (9) that is controlled by a second valve (10);
- at least one preparation reservoir (32) arranged for preparing a magnesium hydroxide slurry by hydrolysis of magnesium oxide powder with water, the preparation reservoir (32) comprising water addition means (42), magnesium oxide powder addition means (31, 31') and agitation means (44) for mixing the water and the magnesium oxide powder;
- slurry transporting means (40, 40', 40", 36, 36', 55) connected to the one or more used scrubber liquid withdrawal pipes (6, 6') or to the closed loop mode scrubber liquid recycle pipe (9), for transporting the prepared magnesium hydroxide slurry from the at least one preparation reservoir (32) towards the used scrubber liquid withdrawn from the wet scrubber (1) in the one or more used scrubber liquid withdrawal pipes (6, 6') or the closed loop mode scrubber liquid recycle pipe (9), which, when the marine exhaust gas desulphurization system is configured to run in closed loop mode, is configured for contacting the magnesium hydroxide slurry with the used scrubber liquid in order to clean the used scrubber liquid and/or to neutralize the acidity thereof;
- wherein the one or more used scrubber liquid withdrawal pipes (6, 6') are configured to withdraw the used scrubber liquid from the wet scrubber via a closed loop mode scrubber liquid recycle pipe (9) towards a used scrubber liquid tank (20) when the wet scrubber system is operating in closed loop mode;
- wherein the marine exhaust gas desulphurization system comprises a storage reservoir (34) that is placed in series with the preparation reservoir (32) and that is connected to the preparation reservoir (32) via a slurry withdrawal pipe (40); and
- wherein the preparation reservoir (32) and the storage reservoir (34), comprise pressure transmitter means (57 and 52) for indicating the actual level of the magnesium hydroxide slurry in the preparation reservoir (32) and the storage reservoir (34), respectively, and comprises agitation control means that are configured to control the agitation means (44 and 47) to continuously agitate the magnesium hydroxide slurry prepared in the preparation reservoir (32) and the storage reservoir (34), respectively, as long as the pressure transmitter means (57 and 52, respectively) indicate that the level of the magnesium hydroxide slurry is above a predetermined minimum level.

18. A method for reducing the amount of sulphur oxides present in an exhaust flue gas of a diesel engine of a marine vessel, the method comprising the steps of:
- conveying exhaust flue gases created in the diesel engine of the marine vessel to a wet scrubber system that is running in a closed loop mode, said system being configured to be able to run in open and closed loop mode and comprising at least one wet scrubber (1); wherein the wet scrubber comprises one or more used scrubber liquid withdrawal pipes (6, 6') for withdrawing the used scrubber liquid from the wet scrubber (1), wherein the used scrubber liquid in the one or more used scrubber liquid withdrawal pipes (6, 6') is further led through an open loop outlet pipe (7) controlled by a first valve (8) in the open loop mode, or through a closed loop mode scrubber liquid recycle pipe (9) that is controlled by a second valve (10) in the closed loop mode;
- scrubbing the exhaust flue gases in the wet scrubber system using a scrubber liquid thereby forming a used scrubber liquid;
- withdrawing the used scrubber liquid from the wet scrubber (1) via one of more used scrubber liquid withdrawal pipes (6, 6') to a used scrubber liquid tank (20) via a closed loop mode scrubber liquid recycle pipe (9) when the wet scrubber system is operating in closed loop mode,
- preparing a magnesium hydroxide slurry by adding magnesium oxide powder and water to a preparation reservoir (32) under agitating conditions, wherein the preparation reservoir (32) comprises a temperature transmitter (58) to measure the temperature inside the preparation reservoir (32), and comprises water addition control means configured to control water addition means (42) to add water into the preparation reservoir (32), and wherein water is added to the preparation reservoir (32) using water addition means (42) under the control of water addition control means in case the temperature of the prepared magnesium hydroxide slurry in the preparation reservoir (32) measured by a temperature transmitter (58) increases above a pre-set temperature limit;
- transporting the prepared magnesium hydroxide slurry to the wet scrubber system via slurry transporting means (40, 40', 40", 36, 36', 55) connected to the one or more used scrubber liquid withdrawal pipes (6, 6') or to the closed loop mode scrubber liquid recycle pipe (9); and;
- contacting the magnesium hydroxide slurry from the preparation reservoir (32) or a storage reservoir (34) with the used scrubber liquid in the closed loop mode scrubber liquid recycle pipe (9) via slurry transporting pipes (36, 36', 55) forming part of the slurry transporting means thereby cleaning the used scrubber liquid and/or neutralizing the acidity thereof.

19. The method according to claim 18, further comprising any of the steps of:

(a) continuously agitating the magnesium hydroxide slurry in the preparation reservoir (32) using agitation means under the control of agitating control means as long as the level of the magnesium hydroxide slurry indicated by pressure transmitter means (57) is above a predetermined level; and/or (b) gradually adding the magnesium oxide powder to the preparation reservoir (32) by a powder transportation and addition means (31, 31') under the control of transportation and addition control means.

20. The method according to claim 18, wherein the prepared magnesium hydroxide slurry is pumped out of the preparation reservoir (32) into a storage reservoir (34) via a slurry withdrawal pipe (40) using pumping means (33, 33').

21. The method according to claim 20, wherein the magnesium hydroxide slurry is pumped out of the storage reservoir (34) into the closed loop mode scrubber liquid recycle pipe (9) via the slurry transporting pipes (36, 36', 55) using pumping means (35, 35').

\* \* \* \* \*